March 31, 1959  O. E. COTE  2,879,994
VACUUM BOX BLANK FEEDER MECHANISM
Filed Aug. 30, 1956  5 Sheets-Sheet 3
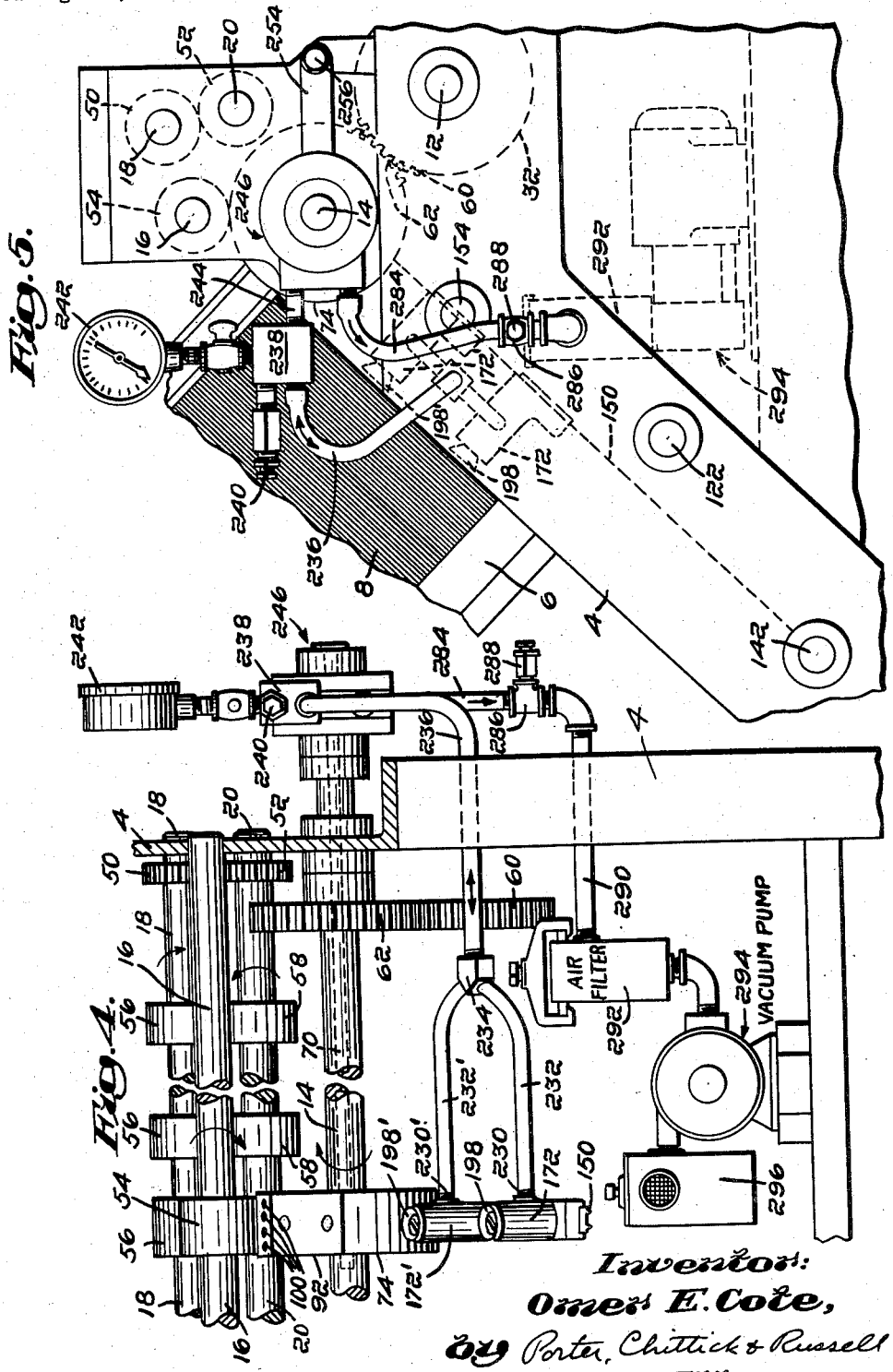
Inventor:
Omer E. Cote,
By Porter, Chittick & Russell
Attorneys March 31, 1959    O. E. COTE    2,879,994
VACUUM BOX BLANK FEEDER MECHANISM
Filed Aug. 30, 1956    5 Sheets-Sheet 4
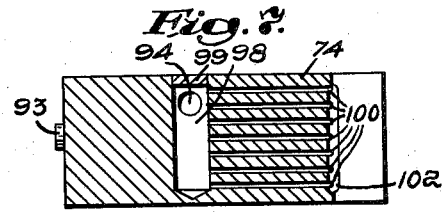
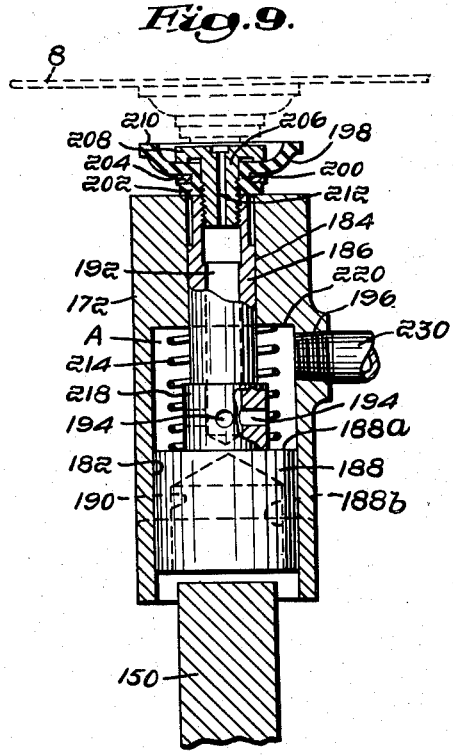
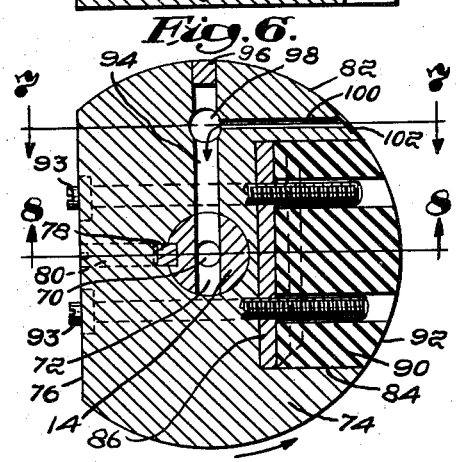
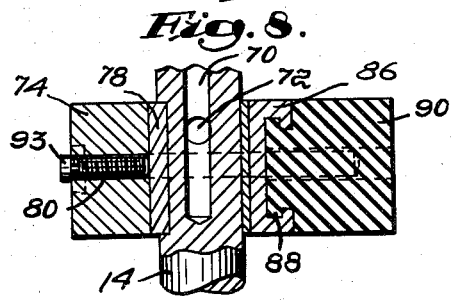
Inventor:
Omer E. Cote,
by Porter, Chittick + Russell
Attorneys March 31, 1959 — O. E. COTE — 2,879,994
VACUUM BOX BLANK FEEDER MECHANISM
Filed Aug. 30, 1956 — 5 Sheets-Sheet 5

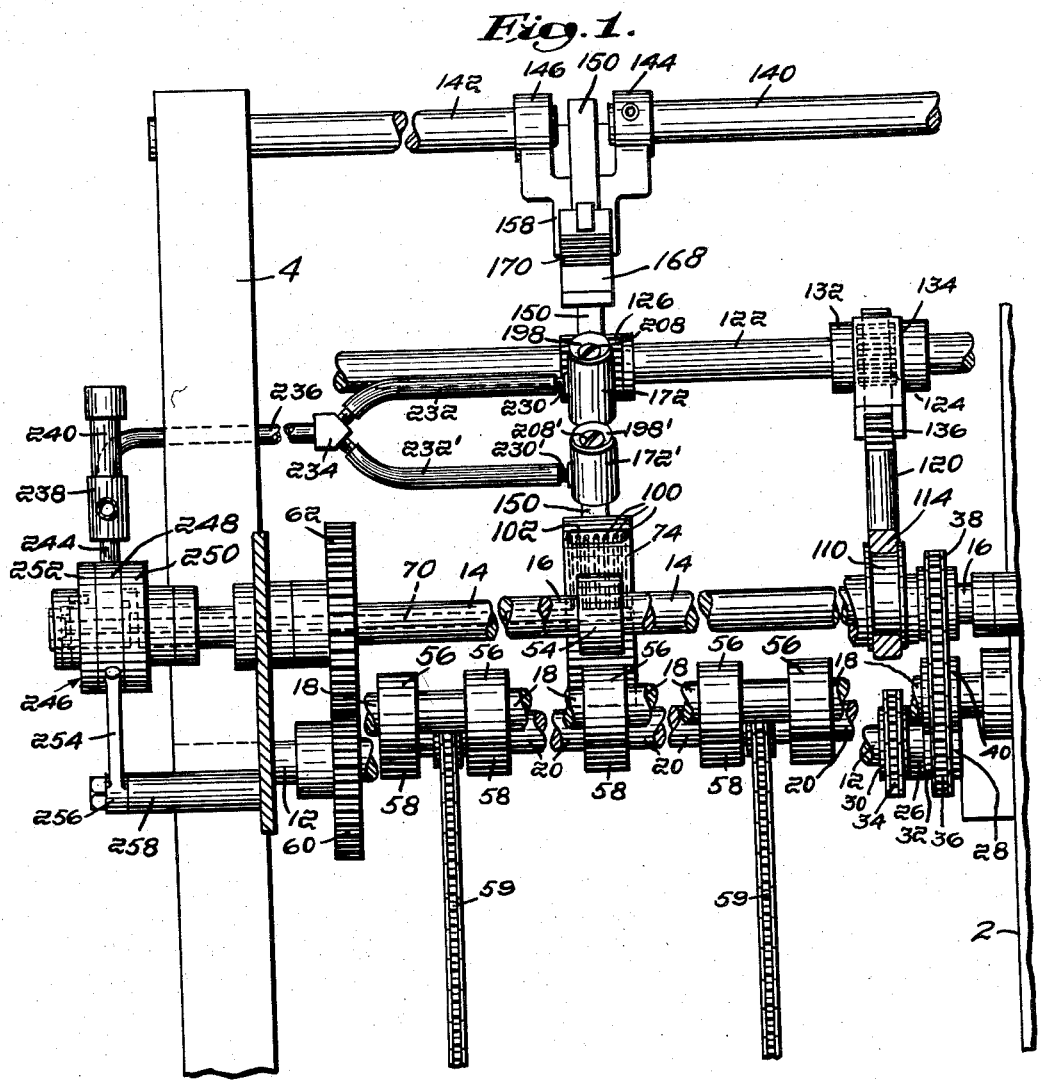

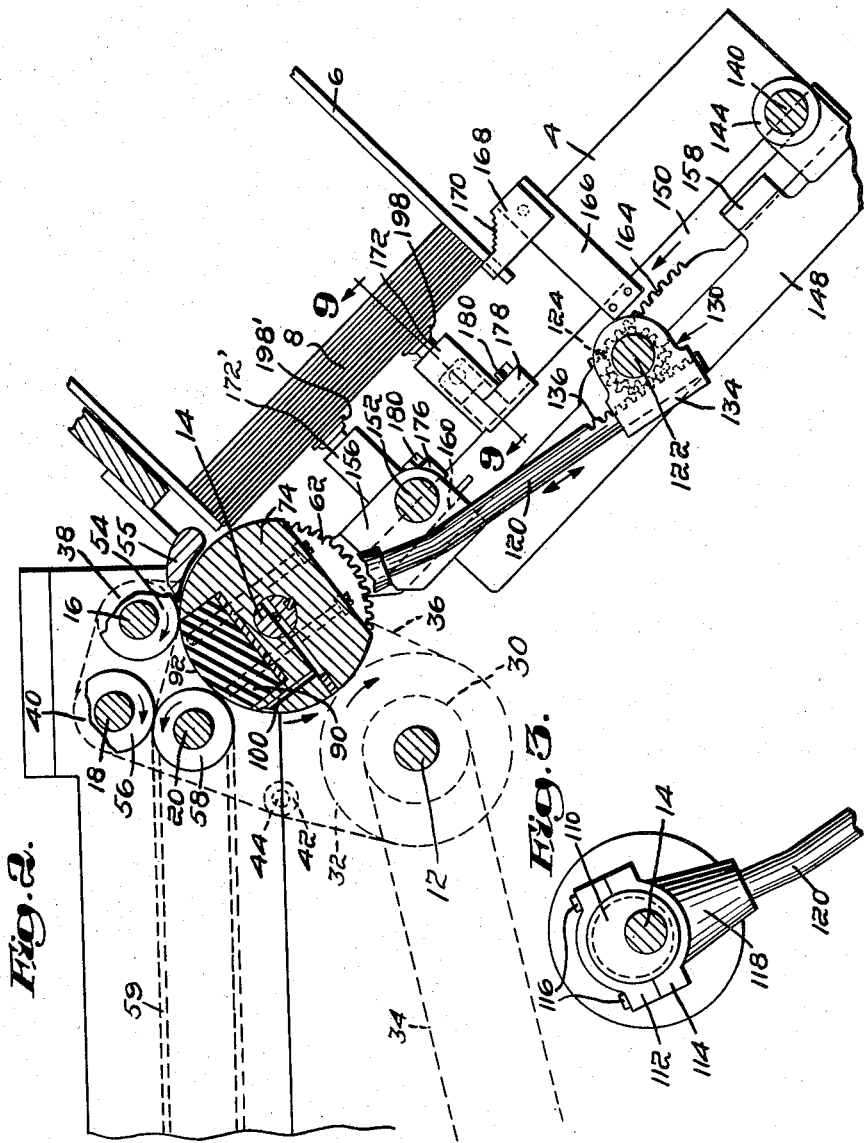

Inventor:
Omer E. Cote,
by Porter, Chittick & Russell
Attorneys

United States Patent Office 2,879,994
Patented Mar. 31, 1959

2,879,994

VACUUM BOX BLANK FEEDER MECHANISM

Omer E. Cote, Providence, R.I., assignor to U.S. Automatic Box Machinery Co., Inc., Boston, Mass., a corporation of Massachusetts Application August 30, 1956, Serial No. 607,123

3 Claims. (Cl. 271—11)

This invention relates to machines for making boxes and more particularly to an improved mechanism for individually and successively feeding box blanks to a box-forming machine.

Heretofore considerable advances have been made in the art of rapidly feeding blanks to a box-forming machine, with emphasis placed on the task of increasing the rate at which blanks are fed. However, the increase in production rate has created and/or made more serious the problems resulting when a feeder mechanism fails to feed only one blank at a time or misses a blank or feeds a blank improperly so as to cause it to become jammed in the machine. When any of these failures occurs there is a loss in production either by automatic or manual shutdown of the machine, or by the making of a faulty product which must be rejected.

Accordingly it is the object of this invention to provide an improved feeder mechanism for box forming machines which includes novel means for individually removing blanks from a storage or magazine section and moving the removed blanks forward for conveyance to the box forming sections of the machine.

A more specific object is to provide a feeder mechanism that utilizes suction to pick up and feed box blanks to a box forming machine.

Another specific object is to provide a blank feeder mechanism for a box forming machine that comprises a reciprocating suction applying member for removing blanks from a magazine section and a rotary suction applying member for picking up blanks removed from said magazine section and projecting said blanks forward into the machine.

Other objects and many of the attendant advantages of this invention will be readily appreciated as the same becomes better understood by reference to the following detailed description when considered in connection with the accompanying drawings, wherein:

Fig. 1 is a plan view of a feeder mechanism constructed according to the present invention, certain parts being broken away to facilitate identification of other related parts;

Fig. 2 is a sectional view in elevation taken mainly along the center line of the machine;

Fig. 3 is an enlarged view of certain features shown in Figs. 1 and 2;

Fig. 4 is a view in elevation looking from right to left in Fig. 2 with the magazine omitted;

Fig. 5 is a side elevation looking from right to left in Fig. 4;

Fig. 6 is an enlarged view of the primary feed roll shown in section in Fig. 2;

Fig. 7 is a sectional view taken along line 7—7 of Fig. 6;

Fig. 8 is a section taken along line 8—8 of Fig. 6;

Fig. 9 is a section taken along line 9—9 of Fig. 2;

Figure 10:
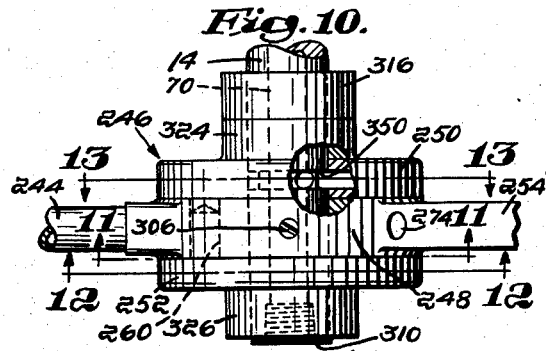
Fig. 10 is a plan view of a suction valve forming part of the invention.
Figure 13:
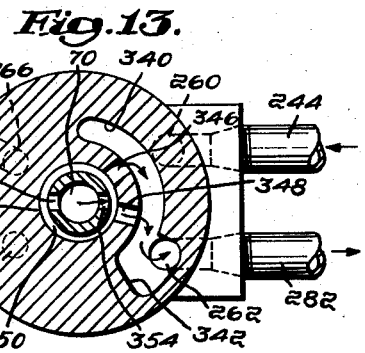
Fig. 13 is a section taken along line 13—13 of Fig. 10.
Figure 11:
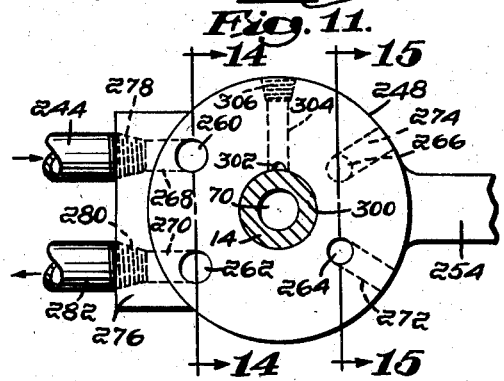
Fig. 11 is a section in elevation taken along line 11—11 of Fig. 10.
Figure 13A:
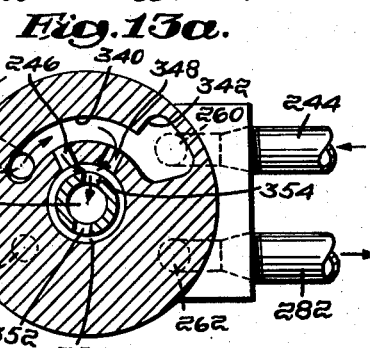
Fig. 13a is a section similar to Fig. 13 with the valve rotated approximately 90°.
Figure 12:
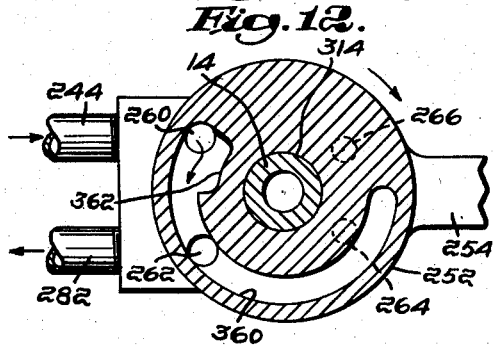
Fig. 12 is a section taken along line 12—12 of Fig. 10.
Figure 14:
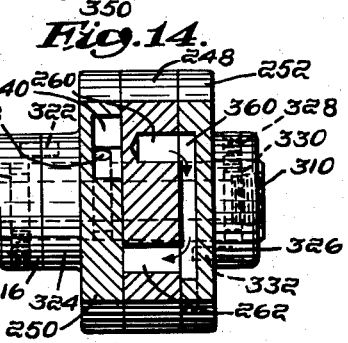
Figure 12A:
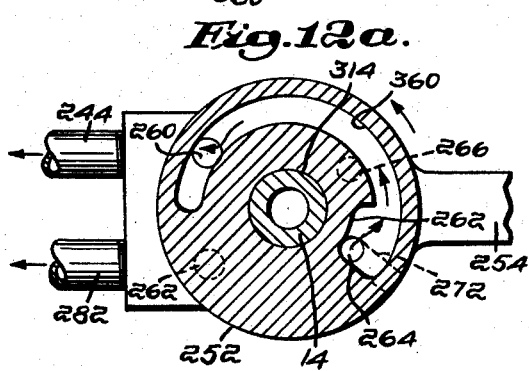
Fig. 12a is a section similar to Fig. 12 with the valve rotated approximately 180°.
Figure 15:
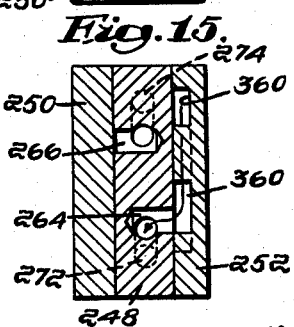

Fig. 14 is a section of Fig. 10 taken along line 14—14 of Fig. 11; and with valve member 252 in the position of Fig. 12 and with valve member 250 in the position of Fig. 13a;

Fig. 15 is a section of Fig. 10 taken along line 15—15 of Fig. 11 and with valve member 252 in the position of Fig. 12a and valve member 250 in the position of Fig. 13.

Referring now to Figs. 1, 2, 4 and 5, there are shown two longitudinally extending side frame members 2 and 4 which form part of the main frame of a box forming machine (not shown).

Supported on the side frame members 2 and 4 is a magazine section (not shown in Figs. 1 and 4) generally identified by the numeral 6 adapted to contain a supply of box blanks 8 in an inclined position as shown immediately behind a plurality of feed rolls hereinafter described.

Journaled in side frame members 2 and 4 in front of magazine 6 are five shafts 12, 14, 16, 18, and 20. A clutch comprising a drive member 26 rotatably carried by shaft 12 and a driven member 28 secured to shaft 12 operates to transmit power to the various moving elements of the blank feeder mechanism. The clutch is of any suitable type and preferably may be made similar to the clutch illustrated and described in my copending application of Ser. No. 409,407 filed February 10, 1954 for Improved Glue Applicator Cutout Mechanism, now Patent No. 2,776,224, issued January 1, 1957.

Driving member 26 of the clutch is provided with two sprocket gears 30 and 32. Gear 30 is driven by a chain 34 which is driven by a suitable prime mover (not shown) such as the main motor drive of the box forming machine. Sprocket gear 32 carries a chain 36 which is also carried by a sprocket 38 secured to shaft 16, sprocket 40 secured to shaft 18, an idler sprocket (not shown) rotatably carried by shaft 14, and an idler sprocket 42 rotatably mounted on a stub shaft 44 carried by frame member 2. With the clutch disengaged, shaft 12 remains at rest when chain 34 drives sprocket 32 and clutch member 26. When the clutch is engaged, clutch member 26 drives clutch member 28 and shaft 12. Thus shafts 16 and 18 always rotate when sprocket 32 is being driven and shaft 12 rotates only when the clutch is engaged. It is to be understood that the clutch is operated by suitable control means (not shown) and normally it is engaged. In practice the clutch is disengaged only when it is desired to terminate feeding of the blanks without shutting down the whole machine.

Adjacent frame member 4 shaft 18 is provided with a gear 50 which meshes with a gear 52 carried by shaft 20. Shaft 18, and shaft 16 as well, rotate in a clockwise direction as viewed in Fig. 2. Shaft 20 is driven by gears 50 and 52 in a counterclockwise direction. Shafts 16, 18 and 20 are each provided with a plurality of small feed rolls 54, 56, and 58 respectively.

Shaft 12 is provided with a gear 60 adjacent frame member 4. Gear 60 meshes with and drives a gear 62 affixed to shaft 14. When the clutch is engaged so as to drive shaft 12, shaft 14 is driven in a counterclockwise direction as viewed in Fig. 2.

Referring now to Figs. 1, 2, and 4 to 9, shaft 14 is provided with a central bore 70 extending from its end outside of frame member 4 to slightly beyond its midpoint. At the inner end of bore 70 shaft 14 is provided with a diametrical bore 72 which intersects bore 70. Mounted on shaft 14 is a large roll 74, hereinafter referred to as the "primary feed roll" or the "suction feed roll." Primary feed roll 74 is circular in cross section except that a chord segment has been removed to leave a flat face 76. At its center opening primary feed roll 74 is provided with an axially extending slot which accommodates a rectangular slug or key 78 that is also received in an axially extending slot in shaft 14. Slug 78 acts to lock roll 74 to shaft 14. A set screw 80 releasably urges the slug 78 into tight engagement with shaft 14. The curved surface 82 of roll 74 is provided with a cavity 84 in which is positioned a metal plate 86 to which is attached by a tongue and groove connection as at 88 a rubber body 90 having a curved surface 92 that is flush with curved surface 82 of the roll and functions as a pickup surface for box blanks. Two screw bolts 93 extend through roll 74 and are threaded into plate 86 so as to hold the plate and rubber body 90 within cavity 84.

Roll 74 has a radial bore 94 which communicates with bore 72 of shaft 14. The outer end of bore 94 is sealed by a plug 96. Intersecting bore 94 is an axially extending bore 98. Bore 98 extends almost all the way through roll 74 and its end is closed off by a suitable plug 99. Communicating with bore 98 are several small bores 100 which open into a straight groove 102 provided in the curved surface 82 of the roll. Groove 102 extends parallel to the axis of roll 74.

Referring now to Figs. 1 to 3, there is affixed to shaft 14 an eccentric or cam 110. Surrounding cam 110 is a collar comprising two sections 112 and 114 held together by suitable screw bolts 116. Collar 114 is provided with an extension 118 to which is attached a tie rod 120.

Journaled in side frame members 2 and 4 is a shaft 122. Secured to this shaft are two pinions 124 and 126 of identical size. Pinion 124 is disposed close to frame member 2 and pinion 126 is located about halfway between side members 2 and 4, residing in the same vertical plane as suction feed roll 74. Surrounding pinion 124 is a housing 130 comprising two sections 132 and 134 removably secured to each other. Shaft 122 extends through and is rotatable relative to housing 130. The rear end of tie rod 120 is rectangular in cross section and is provided with a plurality of gear teeth 136 so as to function as a rack. The rear end of tie rod 120 extends through and is slidably associated with housing 130. Gear teeth 136 of tie rod 120 engage the teeth of pinion 124. Thus as shaft 14 and cam 110 rotate, rod 120 is made to reciprocate relative to housing 130. As it does so its teeth 136 actuate pinion 124 whereby to oscillate shaft 122 and pinion 126.

Secured to side members 2 and 4 and extending toward but terminating short of each other are two bars 140 and 142. The adjacent ends of bars 140 and 142 are secured to the upstanding arms 144 and 146 of a supporting bracket 148 for a slide member 150. The forward end of bracket 148 is provided with a second pair of arms corresponding to arms 144 and 146, and these forward arms are supported by bars 152 and 154 corresponding to bars 140 and 142. Only one of the forward arms, arm 156, of bracket 148 is shown (Fig. 2). Adjacent arms 144 and 146 the supporting bracket 148 is provided with a bifurcated extension 158 which defines a U-shaped channel for slidably receiving and guiding slide member 150. A similar U-shaped guide channel is located at 160 between the forward arms of bracket 148. The two guides function to maintain slide 150 parallel to side members 2 and 4.

The lower edge of slide 150 is provided with teeth 164 which engage pinion 126. Accordingly, when shaft 122 is oscillated, as previously described, pinion 126 acts to reciprocate slide 150 toward and away from suction roll 74.

Slide 150 is provided with an upstanding extension 166 to which is affixed a dog 168 whose serrated leading edge 170 engages the rear edges of the bottom blanks 8 in magazine 6 and pushes them forward in staggered relation toward suction feed roll 74 when slide 150 is oscillated in a forward direction.

Also carried by slide 150 are two substantially cylindrical housings 172 and 172' having laterally projecting ears 176 and 178. Ears 176 and 178 are perforated to receive bolts 180 which screw into tapped openings in the upper surface of slide 150. In practice, a plurality of tapped holes are provided in slide 150 so that the relative positions of housings 172 and 172' may be varied.

Both housings and the elements associated therewith are identical. Fig. 9 shows housing 172 in section. The diameter of the housing is greater than the width of slide 150 so that the large cylindrical bore 182 of the housing is exposed to the atmosphere. The top end of bore 182 terminates in a smaller bore 184. Slidably contained in bore 184 is a cylindrical stem 186. The latter also extends into bore 182 and is provided with a cylindrical piston head 188 whose outside diameter is only a trifle less than the diameter of bore 182, whereby piston head 188 may move in bore 182 without a noticeable leakage of air therebetween. Preferably a cavity 190 is provided in piston head 188, as by drilling, so as to reduce its weight. Stem 186 is provided with a central bore 192 which terminates short of piston head 188. A plurality of radial ports 194 place central bore 192 in communicating relation with bore 182. Housing 172 is provided with a threaded port 196 which opens into bore 182.

Attached to the upper end of stem 186 is a flexible suction cup 198. This cup is constructed of natural or synthetic rubber and comprises a short cylindrical extension 200 having a peripheral flange 202. Surrounding extension 200 between the cup and flange 202 is a metal washer 204. The suction cup is secured to stem 186 by means of a screw 206 which is screwed into bore 192. The head 208 of the screw is located below the upper edge 210 of the suction cup. Screw 206 is provided with an axial bore 212 which communicates with bore 192 of the stem. Surrounding stem 186 is a compression spring 214 which urges piston 188 and stem 186 toward slide 150. Downward travel of the piston head is terminated by engagement of cup flange 202 with the upper end of housing 172. Upward travel of the piston head is limited by engagement of the enlarged portion 218 of the stem with the end wall 220 of bore 182. Upward movement of the stem 186 and piston head 188 occurs when the pressure in chamber A is reduced to such a level that the combined downward force exerted on upper surface 188a of piston head 188 by the air pressure in chamber A and spring 214 is less than the upward force exerted on the bottom surface 188b of the piston by atmospheric pressure. Since the latter pressure is relatively constant, positioning of the piston head and stem is controlled by the air pressure in chamber A. The strength of spring 214 and the relative sizes of piston head surfaces 188a and 188b is such that when the pressure in chamber A is the same as atmospheric pressure, the stem will be in retracted position, as shown in Fig. 9.

Referring now to Figs. 1, 4, 5 and 9, a short nipple 230 is threaded in port 196 of housing 172. A similar nipple 230' is attached to the corresponding port of housing 172'. Attached to these nipples are two short lengths of flexible rubber tubing 232 and 232' whose opposite ends are connected to a hollow distributor head 234 attached to the end of a metal tube 236 which projects through frame member 4. The opposite end of tube 236 is connected to a hollow pressure block 238. Connected to hollow block 238 is a pressure regulator 240 for adjusting the negative pressure within the block 238 and tube 236. Pressure block 238 also carries a vacuum gauge 242 for indicating the magnitude of the negative pressure or suction in the block and tube 236. Pressure block 238 is connected by a nipple 244 to a rotary valve generally identified by the numeral 246.

Referring now to Figs. 10 to 15, rotary valve 246 comprises three members 248, 250 and 252. Valve member 248 is provided with a radially extending supporting arm 254 which is secured at 256 to a fixed shaft 258 attached to frame member 4. Valve member 248 is provided with four axially extending bores 260, 262, 264 and 266 which are angularly spaced from each other. Bore 262 extends completely through valve member 248, from one face to the other. Bores 260 and 264 extend from the face of valve member 248 nearest the adjacent face of valve member 252 and terminate short of the opposite face of valve member 248. Bore 266 runs in the reverse direction, terminating short of the face nearest the adjacent face of valve member 252. The radial distances from bores 260 and 262 to the center of valve member 248 are the same. In the same way bores 264 and 266 are spaced the same radial distance from the center of valve member 248. However, as between bores 260, 262 and bores 264, 266, the latter are closer to the center of valve member 248. Also provided in valve member 248 are four bores 268, 270, 272 and 274 which lie in a common plane extending at right angles to the axis of the valve member and which communicate with bores 260, 262, 264 and 266 respectively. Bores 272 and 274 lead to the atmosphere. A lateral extension 276 of valve member 248 is provided with two tapped openings 278 and 280 which lead to bores 268 and 270 respectively. Nipple 244 connected to pressure block 238 is threaded in opening 278. A pipe fitting 282 is threaded in opening 280. Secured to fitting 282 is a section of tubing 284 which is secured to a T fitting 286 carrying a vacuum valve 288. Fitting 286 is also connected to a pipe 290 which extends through frame member 4 and leads to an air filter 292. The latter is connected to a motor driven vacuum pump generally designated by numeral 294. The outlet side of the vacuum pump is preferably provided with an exhaust air filter 296. When the pump is operating it draws air through line 290 and filter 292, and exhausts it to the atmosphere through filter 296, thereby creating a suction or negative pressure in line 284 by way of line 290.

Returning now to valve member 248, it is provided with a central hole 300 through which rotatably extends shaft 14. An oil groove 302 is provided on the edge of hole 300. Communicating with oil groove 302 is a radial bore 304 which has a removable screw plug 306. By removing plug 306 it is possible to inject additional oil to groove 302. The oil acts as a lubricant and an air seal between the adjacent engaging faces of valve members 248, 250 and 252.

The outer end of shaft 14 is provided with a removable screw plug 310 which closes off its central bore 70. Valve members 250 and 252 also are provided with central openings 312 and 314 respectively to accommodate shaft 14. Valve member 250 is held against valve member 248 by a driver collar 316 which is secured to shaft 14 by means of a set screw 318 which is received by a groove 320 in shaft 14. Driver collar 316 has a pin 322 which extends into a cavity in the hub face 324 of valve member 250. Since the driver is locked to shaft 14 by set screw 318 and is also locked to valve member 250 by pin 322, valve member 250 will rotate with shaft 14 relative to valve member 248. Engaging valve member 252 is a second driver collar 326 which is locked to shaft 14 by a set screw 328 which is received in a groove 330 in shaft 14. A pin 332 carried by driver collar 326 projects into a cavity in the face of valve member 252 and acts to drive valve member 252 in synchronism with valve member 250.

Details of valve member 250 are shown in Figs. 10 and 13–15. First of all valve member 250 is provided with an arcuate groove 340 in the face which engages stationary valve member 248. The radial distance from groove 340 to the axis of shaft 14 is the same as that of bores 264 and 266. However, the trailing end of groove 340 is enlarged as at 342 so as to be registrable with bore 262. Intermediate its opposite faces valve member 250 has two radial passages 346 and 348 which lead from groove 340 to its center opening 312. In the same vertical plane as passages 346 and 348 shaft 14 has a peripheral groove 350 and a pair of radial bores 352 and 354 which lead from groove 350 to central bore 70.

Operation of valve member 250 is as follows: When the enlarged portion 342 of groove 340 is open to bore 262 of valve member 248 (as seen in Fig. 13), suction is applied to roll 74. In this case air is withdrawn through passages 100, bore 98, bore 94, bore 72, bore 70, radial bores 352 and 354, groove 350, radial passages 346 and 348, groove 340, bore 262, bore 280, tube 284, pipe 290, filter 292, and pump 294, and exhausted to the atmosphere through exhaust filter 296. After the enlarged portion 342 of groove 340 is rotated out of registration with bore 262, pump 294 is no longer capable of applying suction to roll 74. A short interval of time after bore 262 is closed to groove 340, the leading end of the latter comes into registration with bore 266 (Fig. 13a), whereupon bore 70 is vented to the atmosphere via bores 266 and 274. When this occurs, the vacuum or suction existing in bore 70 and the connecting passages of suction roll 74 is terminated. Vacuum is reapplied to bore 70 and suction roll 74 when the enlarged portion 342 of groove 340 again comes into registration with bore 262 (Fig. 13). In practice the enlarged groove portion 342 subtends an arc of about 32°, so that suction is applied to roll 74 a period of time equal to the time consumed while the feed roll rotates through an angle of 32°.

Details of valve member 252 are illustrated in Figs. 10–12a. First of all, valve member 252 is provided with an arcuate groove 360 in the face which engages stationary valve member 248. The radial distance of groove 360 relative to the axis of shaft 14 is the same as that of bores 260 and 262. However, the leading end of groove 360 is enlarged as at 362 so as to be capable of registration with bore 264.

Operation of valve member 252 is as follows: When the enlarged portion 362 of groove 360 is in registration with bore 260 (Fig. 12), suction is applied to the cups 198 and 198' by way of pump 294, filter 292, pipe 290, tube 284, bore 280, bore 262, groove 360, bore 260, bore 278, pressure block 238, tube 236, and lines 232 and 232'. The reduced pressure in chamber A of cup housing 172 and 172' allows the cup stems to be extended under the influence of the atmospheric pressure applied to the pistons through the open bottom ends of the cup housings. At the same time air is drawn through the cup stems away from the cups so that if the cups are in engagement with a box blank while in extended position, the box blank will cling to the cups under suction. As the valve member 252 continues to rotate relative to valve member 248 in the direction shown by the arrows in Figs. 12 and 12a, the groove 360 will move out of registration with bore 262. Thereupon pump 294 will be disconnected from line 236 leading to the suction cups, so that no more air will be evacuated from cup housings 172 and 172'. At the same time, however, no air can pass into line 236 to disturb the vacuum or partial vacuum therein. Shortly thereafter, valve member 252 will rotate into the position shown in Fig. 12a. In this position the leading enlarged end of groove 360 will be in registration with bore 264 and the trailing end of the groove will be in registration with bore 260. When this occurs, air from the atmosphere is admitted to chamber A of cup housings 172 and 172' by way of bore 272, bore 264, groove 360, bore 260, pressure block 238, line 236, and lines 232 and 232'. Immediately the partial vacuum is broken in chambers A of the cup housings 172 and 172', allowing the cup stems to be retracted by the action of the springs contained in the cup housings. At the same time air will pass up through the cup stems and the cup screws. This acts to release a box blank that may have been clinging to the cups under suction.

The groove 340 of valve member 250 extends through an angle of approximately 157°. Hence feed roll 74 is vented for a time interval equal to the time required for feed roll 74 to rotate through 157°. The enlarged portion 342 of groove 340 extends through an angle of 32°. Accordingly, feed roll 74 is subjected to suction for a time interval equal to the time required to rotate 32°.

Groove 360 of valve member 252 subtends an angle of about 229°. Since the angle between bores 260 and 262 is preferably about 70°, the cups are subjected to suction for a period approximately equal to the time that it takes valve member 252 to rotate 159°. The enlarged portion 362 of groove 360 measures about 45°. Accordingly the cups are vented for a period of time equal to the time required for feed roll 74 to rotate 45°.

In summary the feed roll is subjected to suction only briefly in comparison to the cups but is vented for a much longer period of time.

The angular positions of rotatable valve members 250 and 252 relative to each other is such as to provide a cycle of operation as follows: (1) suction is applied to the cups 198 and 198'; (2) suction is removed from the cups; (3) atmospheric pressure is introduced to the cups to break the vacuum; (4) suction is applied to the primary feed roll 74; (5) suction is removed from roll 74; and, (6) atmospheric pressure is introduced to the interior of the feed roll to terminate the vacuum or partial vacuum therein. The foregoing cycle is repeated at a constant rate so long as the apparatus is in operation. It is to be understood that the foregoing cycle may be modified by shifting the relative angular positions of valve members 250 and 252, whereby, for example, suction may be applied to vacuum feed roll 74 at the same time that atmospheric pressure is being applied to the cups and/or suction may be reapplied to the cups at the same time that suction is removed from feed roll 74. The duration of each of the evacuating and venting operations may be varied by changing the rotational speed of shaft 14 or by modifying the lengths of grooves 340 and 360 of valve members 250 and 252.

Feed roll shaft 14 rotates continuously so long as clutch members 26 and 28 are engaged. Pump 294 also operates continuously. For each revolution of hollow shaft 14 and suction feed roll 74, eccentric 110 causes slide 150 to reciprocate once. The relative angular positions of primary feed roll 74 and eccentric 110 is such that when slide 150 is at or close to the end of its forward stroke, rubber block 90 of feed roll 74 is in position to engage the forward or leading edge of the bottommost blank of the pile of box blanks 8 stored in magazine 6. As the feed roll picks up the bottommost box blank slide 150 commences its rearward stroke away from the feed roll.

Operation of the above described feeder mechanism is as follows: Assuming that clutch members 26 and 28 are engaged, pump 294 is operating and a supply of box blanks 8 is stored in magazine 6, suction is applied to cup housings 172 and 172' just as slide 150 reaches the end of its rearward stroke. Upon application of suction to the cup housings, the cups are shifted upwardly against the bottommost blank in magazine 6. The cups have a slight over-travel when they move upwardly so as to assure contact with concavely bent blanks. When the cups engage the bottommost blank, suction applied to the cups through the cup stems causes the bottommost blank to cling to the cups. Almost simultaneously slide 150 commences its forward stroke, carrying the cups and the blank adhering to the cups forwardly and upwardly toward the feed roll 74. During forward movement of slide 150, dog 168 engages the rear edges of several of the next blanks, causing them to shift forward toward feed roll 74 in staggered relation to each other. As slide 150 approaches the end of its forward stroke, the suction is terminated and atmospheric pressure is introduced to cup housings 172 and 172' to break the vacuum in chambers A of the housings, whereupon the blank is released from the cups and the cups are retracted by the springs in the cup housings. As the cup housings are being vented to the atmosphere, suction is applied to feed roll 74.

A short time after the cups have been retracted, about the time that it takes feed roll 74 to rotate through 15°, the blank, at a point intermediate its leading and trailing edges and preferably closer to its leading edge, is drawn up against feed roll 74 by the suction applied through passages 100. The feed roll rotates counterclockwise (Fig. 2) so that groove 102 and passages 100 lead rubber block 90. Consequently when the blank is drawn by suction toward the feed roll, a substantial part of the blank is in position to be engaged by rubber block 90. The latter then operates to carry the blank forward beneath a horizontal guide 55 and under small roll 54. The blank passes from between rolls 74 and 54 to and between rolls 56 and 58. The latter deliver the blank forward into the box forming machine. In the present case, for example, there is schematically presented in Fig. 1 sections of two chain conveyors 59 normally associated with box forming machines. The conveyors receive blanks from the feeder mechanism and deliver them in turn to the various stages of the box forming machine.

Since the portion of feed roll 74 that surrounds groove 102 makes contact with the box blank intermediate its leading and trailing edges, the leading edge of the box blank is grabbed by rolls 56 and 58 just as groove 102 approaches approximately 12 o'clock position. The feed roll suction drops off at this point or slightly beforehand. This occurs when the feed roll has rotated through an angle of about 32° after application of suction or about 15° after making contact with the box blank. The feed roll suction is terminated rapidly and previous to engagement of the box blank by rolls 56 and 58 so that the blank will be free to be drawn forward by the aforesaid rolls. About the time that the cups 198 and 198' are being retracted, slide 150 commences its rearward stroke. The cycle of operation as just described is repeated when the slide completes its rearward stroke. The cycle of operation is controlled by the rotary valve members 250 and 252. While the suction may be greater, it has been found that in general the desired results can be achieved when the vacuum fluctuates from 0 to about 8".

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practised otherwise than as specifically described or illustrated.

I claim:

1. In combination with a magazine for storing box blanks in a pile, means for removing the bottommost blank from the magazine and delivering said blank to a blank feeding and conveying mechanism, said means comprising a slide positioned beneath said magazine in a plane parallel to said bottommost blank, means for reciprocating said slide forwardly and rearwardly in said plane in an axial direction, a hollow housing attached to the upper side of said slide, said housing having its central axis extending at right angles to said slide and said bottommost blank, a piston slidably positioned in said housing, said piston being movable toward and away from said magazine, a stem attached to said piston, the upper end of said stem extending through the upper end of said housing, said stem having an axially extending passageway running from its upper end toward said piston, said passageway terminating short of said piston and being open to the interior of said housing adjacent its lower end, a resilient suction cup attached to the outer end of said stem, said cup having a central opening communicating with said stem passageway, means in said housing urging said piston toward said slide away from said magazine, means for applying suction to said housing at a point above the top end of said piston whereby said piston will move toward said magazine, stop means limiting upward movement of said piston, the length of said stem being such that when said piston has moved upwardly to the extent permitted by said stop means said cup will be in engagement with the bottommost blank in said magazine and said blank will be held against said cup by the suction applied to said housing and directed to said cup by way of said stem passageway.

2. The combination of claim 1, further including valve means for controlling said suction-applying means, said valve means repeatedly acting to apply suction to said housing when said slide has completed its rearward stroke and to discontinue suction to said housing as said slide is completing its forward stroke.

3. Mechanism for moving the lowermost blank of a pile of flat blanks laterally of said pile, said machanism comprising one or more suction cups and supporting means therefor located below said lowermost blank, means for moving said cups and supporting means laterally of said pile of blanks and for returning said cups and supporting means to original position, a suction line leading to said cups, a valve in said suction line operating in timed relation to said cup moving means, said supporting means including intermediate means directly supporting said cups and movable toward and away from said blanks, the suction of said suction line acting when said valve is open to move said intermediate supporting means toward said lowermost blank to put said suction cups into gripping relation with said blank and to maintain said gripping relation while said supporting means moves laterally a predetermined distance, and upon closing of said valve to eliminate said suction and to free said blank of said cups to permit return of said supporting means to original position to permit said cups to grip the next blank upon reopening of said valve, a feed roll positioned to receive said lowermost blank when the blank has been moved laterally by said cups, said feed roll having openings in its periphery and operating in timed relation to said cup supporting means whereby said openings will be under the leading portion of said blank as the blank is freed from said suction cups, a second suction line leading to said openings, a second valve acting in timed relation to said first valve for eliminating suction in said second suction line after said blank has been held against said feed roll by the suction at said openings for less than a full rotation of said feed roll.

References Cited in the file of this patent

UNITED STATES PATENTS

| | | |
|---|---|---|
| 696,186 | Orloff | Mar. 25, 1902 |
| 906,827 | Staude | Dec. 15, 1908 |
| 1,153,434 | Kruse | Sept. 14, 1915 |
| 1,155,503 | Moore | Oct. 5, 1915 |
| 1,222,535 | Crum | Apr. 10, 1917 |
| 1,715,358 | Harrold | June 4, 1929 |
| 1,815,360 | Harrold | June 4, 1929 |
| 1,990,334 | Koppe | Feb. 5, 1935 |
| 2,004,882 | Vorms | June 11, 1935 |
| 2,084,065 | Reinartz | June 15, 1937 |
| 2,163,274 | Dixon | June 20, 1939 |
| 2,165,786 | Christman | July 11, 1939 |
| 2,185,652 | Speiss | Jan. 2, 1940 |
| 2,215,458 | Backhouse | Sept. 24, 1940 |
| 2,378,306 | Leonhart | June 12, 1945 |
| 2,601,984 | Pope | July 1, 1952 |
| 2,767,982 | Noon | Oct. 23, 1956 |

FOREIGN PATENTS

| | | |
|---|---|---|
| 338,378 | Great Britain | Nov. 20, 1930 |